United States Patent [19]
Schneider

[11] Patent Number: 5,902,001
[45] Date of Patent: May 11, 1999

[54] EXPANDABLE ROOM FLAT FLOOR SYSTEM UTILIZING NOTCHED INNER RAILS AND RAMPED OUTER RAILS

[75] Inventor: Robert H. Schneider, Beaver Dam, Wis.

[73] Assignee: Applied Power, Inc., Butler, Wis.

[21] Appl. No.: 08/823,169

[22] Filed: Mar. 25, 1997

[51] Int. Cl.[6] ....................................................... B60P 3/34
[52] U.S. Cl. .................................... 296/26.13; 296/26.12; 296/171; 296/175
[58] Field of Search .............................. 296/26.13, 26.12, 296/26.01, 26.08, 26.09, 171, 172, 173, 175, 176, 165; 52/67

[56] References Cited

U.S. PATENT DOCUMENTS

| | | |
|---|---|---|
| 1,279,819 | 9/1918 | Zingsheim et al. . |
| 2,704,223 | 3/1955 | Houdart . |
| 2,732,251 | 1/1956 | Meaker . |
| 2,813,747 | 11/1957 | Rice, Jr. . |
| 2,842,972 | 7/1958 | Houdart . |
| 2,901,282 | 8/1959 | Meaker . |
| 3,106,750 | 10/1963 | Jarman . |
| 3,169,280 | 2/1965 | Jarman . |
| 3,719,386 | 3/1973 | Puckett et al. . |
| 4,049,310 | 9/1977 | Yoder . |
| 4,128,269 | 12/1978 | Stewart . |
| 4,500,132 | 2/1985 | Yoder . |
| 4,930,837 | 6/1990 | Marsh et al. . |
| 5,090,749 | 2/1992 | Lee . |
| 5,237,782 | 8/1993 | Cooper . |
| 5,280,985 | 1/1994 | Morris . |
| 5,295,430 | 3/1994 | Dewald, Jr. et al. . |
| 5,332,276 | 7/1994 | Blodgett, Jr. . |
| 5,333,420 | 8/1994 | Eden . |
| 5,491,933 | 2/1996 | Miller et al. . |
| 5,570,924 | 11/1996 | Few et al. . |
| 5,577,351 | 11/1996 | Dewald, Jr. et al. . |
| 5,624,224 | 4/1997 | DiBiagio et al. . |
| 5,758,918 | 6/1998 | Schneider et al. .................. 296/26.13 |

*Primary Examiner*—Joseph D. Pape
*Attorney, Agent, or Firm*—Quarles & Brady LLP

[57] ABSTRACT

An interior arrangement used in an expandable room structure includes a first room section having a stationary floor with an upper surface. A second room section is movable relative to the first section between a retracted position and an extended position to expand the interior volume of the vehicle, and the second room section has a floor with a top surface. A pair of substantially parallel outer rails is provided for supporting the first room section, and a pair of substantially parallel inner rails is provided for supporting the second room section. Each of the inner rails is slidably mounted for longitudinal movement relative to one of the outer rails. An operating mechanism selectively moves the inner rails relative to the outer rails to extend and retract the second room section relative to the first room section. The operating mechanism is constructed and arranged to translate inward and outward movement between the inner rails and the outer rails into substantially vertical movement of the second room section relative to the stationary floor. The operating mechanism includes a gear track extending along a sloped path of travel defined by the inner rails so as to align the top surface of the second room section floor with the upper surface of the stationary floor as the second room section is moved to its extended position, and to vertically offset the top surface of the second room section floor relative to the upper surface of the stationary floor as the second room section is moved to its retracted position. The operating mechanism substantially maintains parallelism between a longitudinal axis of the inner rail and the floor of the second room section, and between a longitudinal axis of the outer rail and the stationary floor over the entire range of movement of the second room section relative to the first room section.

19 Claims, 6 Drawing Sheets

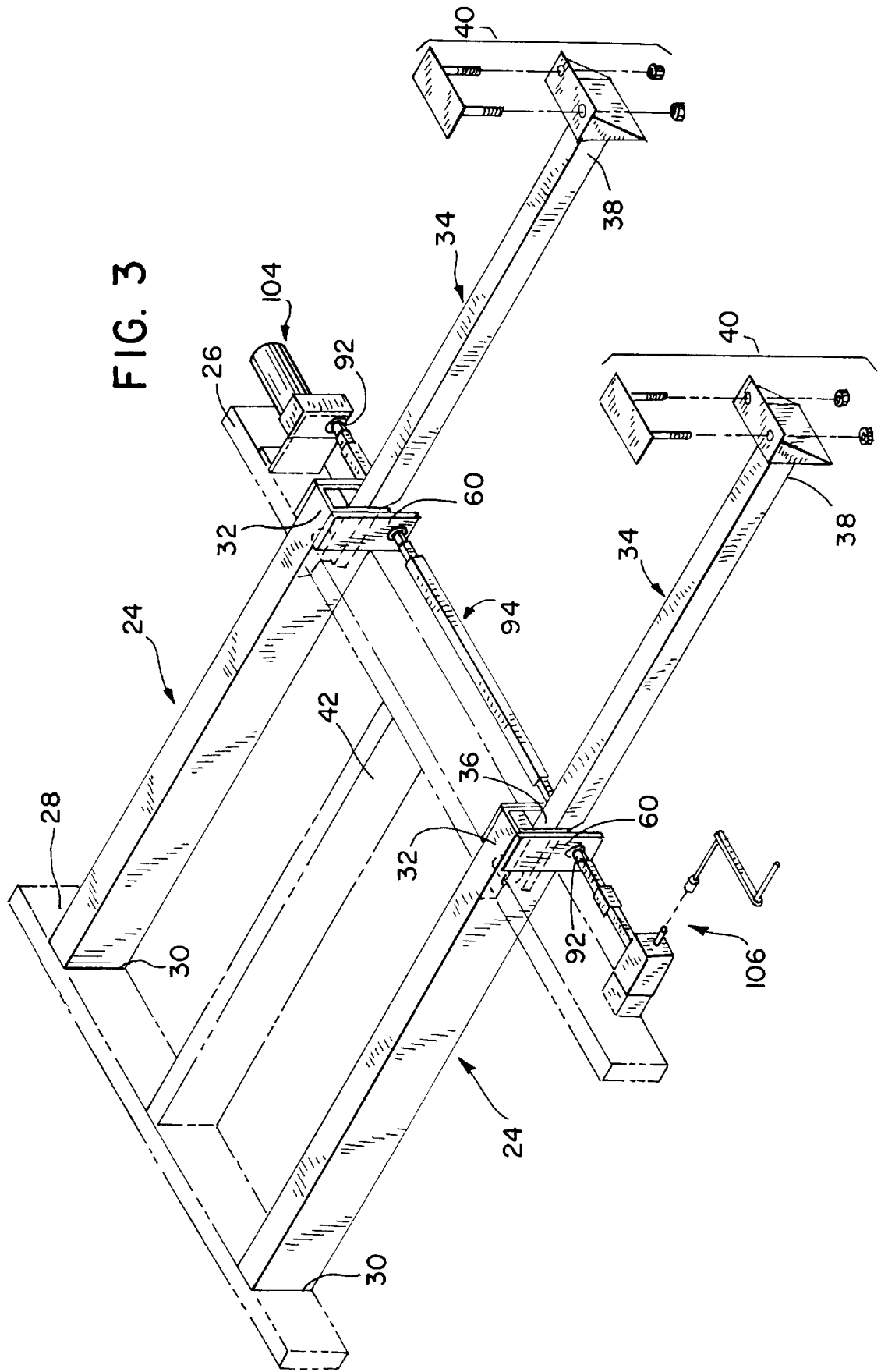

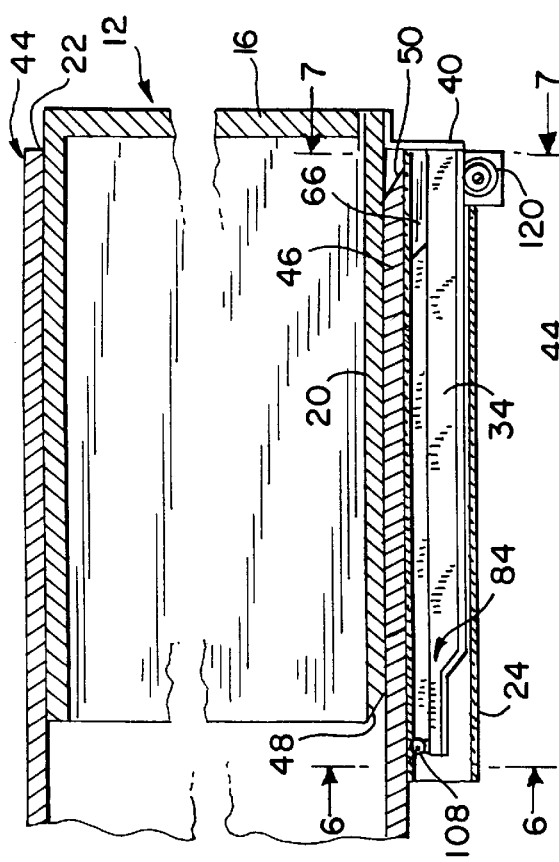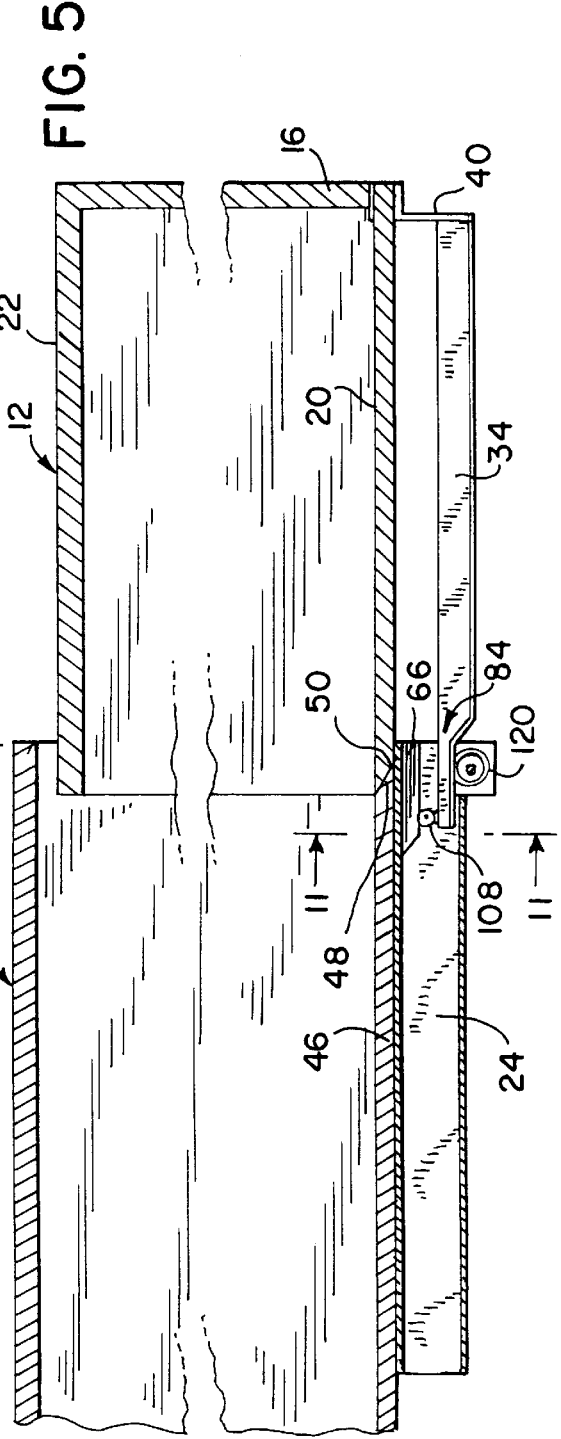

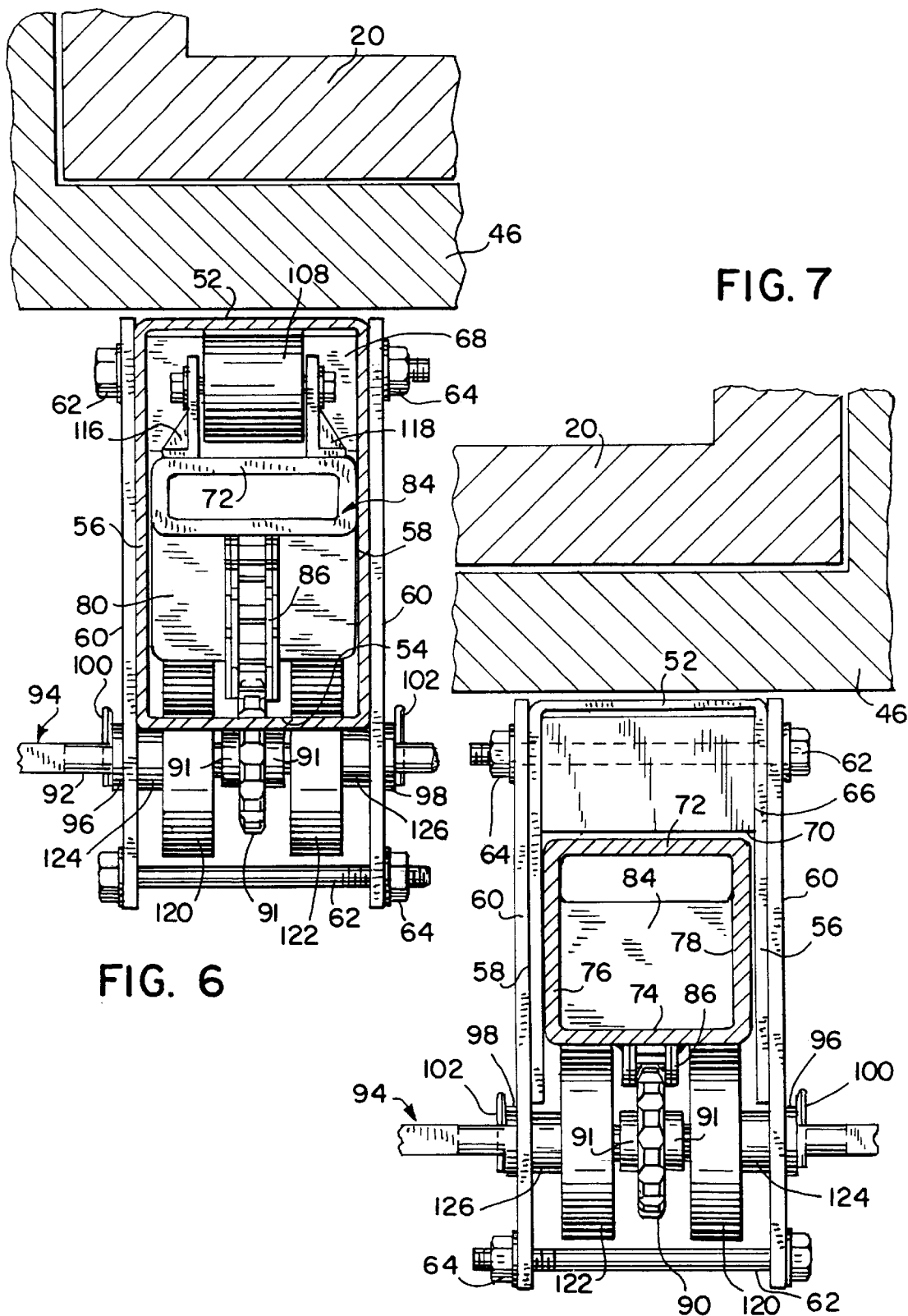

५,९०२,००१

EXPANDABLE ROOM FLAT FLOOR SYSTEM UTILIZING NOTCHED INNER RAILS AND RAMPED OUTER RAILS

FIELD OF THE INVENTION

This invention relates broadly to expandable vehicles and, more particularly, pertains to improvements in a flat floor arrangement for use with an extendable and retractable room slide-out section of a trailer or recreational vehicle.

BACKGROUND OF THE INVENTION

In order to increase the available interior space of recreational vehicles or trailers, slide-out rooms or sections can be made integral with the structure of the vehicle or trailer. During transit, these rooms can be retracted and stored in the interior of the vehicle or trailer with the exterior wall of the slide-out room approximately flush with the exterior of the vehicle or trailer. To use the slide-out room, the vehicle is first parked and leveled. The slide-out room is then slid outward from the vehicle to an extended position, increasing the interior space of the vehicle.

In prior art constructions, the floor of the movable slide-out room is typically supported above the floor of the portion of the room which remains stationary when the slide-out room is in its retracted position, and thus forms a portion of the usable interior floor while the vehicle is in transit. The floor of the movable slide-out room is higher than the floor of the stationary room section, which creates a step up from the stationary floor to the floor of the slide-out room when the slide-out room is placed in the expanded position. This step formed by the differential in floor height is undesirable, inconvenient, and may lead to injury from one unwarily tripping or stumbling thereover. Besides limiting the mobility of an occupant of the slide-out room, the step can cause difficulty in furniture placement and detract from the overall aesthetic appearance of the floor.

To address the problems created by this floor height differential, various slide-out structures have been proposed which allow the movable and stationary floors to have flush or coplanar upper surfaces at least when the slide-out room is in the expanded position. One such flat floor slide-out apparatus is disclosed in U.S. Pat. No. 5,491,933 issued Feb. 20, 1996 to Miller et al. In this patent, a sliding inner tube is movable laterally to pivot as the movable and stationary floor slide into the same horizontal plane during movement of the slide-out room section to its extended position. In seeking this position, however, the inner tube supporting the floor of the slide-out room section, which is dropped into flush engagement with the stationary floor, sags or tips downwardly due to the torque exerted by gravity in reaching a cantilevered position. This requires modification of the outer beam to provide a ramped surface, and also places undue stress on the drive element upon which the inner tube directly pivots.

Another factor in the design of an improved expandable vehicle is possible misalignment of the slide-out room during expansion. Chances for misalignment grow proportionately as the length of the slide-out room and the ensuing cantilevered weight exerted thereby increases. Any misalignment in the support mechanism for the slide-out room can lead to binding or skewing problems during movement of the slide-out room section between its extended and retracted positions.

It is an object of the present invention to provide a flat floor arrangement for a slide-out room section of a vehicle which is economical to manufacture and is dependable in use. It is another object of the invention to provide a flat floor arrangement which will ensure a low friction sliding operation without binding or misalignment problems. A further object of the invention is to provide a flat floor arrangement which involves cooperating movement of the support structure beneath the stationary floor and the floor of the slide-out room section.

BRIEF SUMMARY OF THE INVENTION

The present invention advantageously provides a flat floor arrangement for an expandable trailer or vehicle body specifically designed to overcome the limitations of the prior art by combining mechanical simplicity with structural integrity in a low friction smoothly actuated, cost effective embodiment.

One aspect of the invention contemplates a flat floor arrangement for a vehicle having an interior with a stationary floor and including a movable room section movable between a retracted position and an extended position to expand the volume of the vehicle interior. The movable room section is movable between an operative position in which a top surface of the movable floor is substantially coplanar with an upper surface of the stationary floor when the movable section is in its extended position, and an inoperative position in which the floor is vertically offset above the stationary floor. The stationary floor is preferably supported on a set of substantially parallel outer rails secured to the vehicle, and the movable room section is supported on a set of substantially parallel inner rails. Each of the inner rails is slidably mounted for longitudinal movement relative to one of the outer rails. A moving and supporting system is associated with the movable room section and the stationary floor for selectively moving the inner rails into and out of the outer rails to extend and retract the movable room section. The moving and supporting system is constructed and arranged to provide simultaneous lateral and vertical movement of the movable room section while maintaining the floor of the movable room section substantially parallel to the stationary floor as the movable room section moves from the retracted position to the extended position. A drive arrangement is provided on each pair of inner rails and outer rails and includes a drive gear rotatably mounted on a drive axis at one end of each outer rail, a drive shaft assembly joining each of the drive gears to provide rotational force thereto and at least one motive device connected to the drive shaft assembly for rotating the drive gears to move the inner rails relative to the outer rails and cause relative movement between the movable room section and the stationary floor. In a preferred form, the drive arrangement includes a flexible rack in the form of a roller chain rigidly mounted to the inner rail and provided along an arcuate path toward the inner end of each inner rail. The flexible rack is engageable with the drive gear to enable movement of the movable room section between an operative position in which a top surface of the movable room section floor is substantially coplanar with an upper surface of the stationary floor when the movable room section is in its extended position, and an inoperative position in which the movable room section is vertically offset above the stationary floor so as to permit the movable section to move to the retracted position. An inclined ramp is formed toward the outer end of each outer rail, and a first support roller arrangement is mounted toward the inner end of each inner rail for engagement with the inclined ramp as the inner rails are moved into and out of the outer rails. The roller chain is secured along a bottom surface of each inner rail, and the inner end of each inner rail includes a notched portion having a sloped surface defining the arcuate path and along which the roller chain is secured. A second roller arrangement is mounted on the outer end of each outer rail for rotation on the drive axis of the drive gear for engagement with the bottom surface of each inner rail as the inner rails are moved into and out of the outer rails. The inner rails and outer rails are suitably dimensioned such that at a predetermined time in the movement of the movable section between the retracted position and the extended position, the first support roller arrangement will move along the inclined ramp and the drive gear will simultaneously engage the roller chain along the sloped surface, thereby moving the inner rails laterally as well as vertically so as to move the movable room section between the operative and inoperative positions while maintaining the movable room section floor parallel to the stationary floor.

In another aspect of the invention, a vehicle has an interior with a stationary floor and includes a movable section movable between a retracted position and an extended position to expand the volume of the vehicle interior. The stationary floor is supported on a pair of substantially parallel outer rails secured to the vehicle, each of the outer rails having a longitudinal axis, a top wall, a bottom wall, a pair of sidewalls, an inner end and an outer end. The movable section has a floor and is supported on a pair of substantially parallel inner rails, each of the inner rails being slidably mounted for longitudinal movement within one of the outer rails. Each of the inner rails has a longitudinal axis, a top wall, a bottom wall, a pair of sidewalls, an inner end and an outer end. A cooperating ramp arrangement is located on the outer end of each outer rail and the inner end of each inner rail for permitting the movement of the movable room section between an operative position in which a top surface of the movable section floor is substantially coplanar with an upper surface of the stationary floor when the movable section is in the extended position, and an inoperative position in which the floor of the movable section is vertically offset above the stationary floor so as to enable the movable section to be moved to the retracted position.

In yet another aspect of the invention, a vehicle having an interior with a stationary floor includes a movable room section movable between a retracted position and an extended position to expand the volume of the vehicle interior. The movable room section has a floor and is movable between an operative position in which a top surface of the movable section floor is substantially coplanar with an upper surface of the stationary floor when the movable section is in its extended position, and an inoperative position in which the movable section floor is vertically offset above the stationary floor. A drive arrangement is associated with the movable section and the stationary floor for moving the movable section floor relative to the stationary floor in combined lateral and vertical directions between the operative and inoperative positions while maintaining a parallel relationship between the movable section floor and the stationary floor. The movable section floor and the stationary floor define cooperative bearing surfaces engageable with each other such that upon movement of the movable room section between its extended and retracted positions, a bottom surface of the movable section floor will slide upon the upper surface of the stationary floor and, at a predetermined point, the movable section floor bearing surface will slide along the stationary floor bearing surface. That is, upon movement of the movable section floor to its extended position, the bottom surface of the movable section floor will slide outwardly upon the upper surface of the stationary floor, and the movable section floor bearing surface will slide downwardly along the stationary floor bearing surface. Upon movement of the movable section to its retracted position, the movable section floor bearing surface will slide upwardly along the stationary floor bearing surface and the bottom surface of the movable section floor will slide inwardly upon the upper surface of the stationary floor.

Still yet another aspect of the invention contemplates a vehicle having a first room section having a stationary floor with an upper surface. A second room section is movable relative to the first room section between a retracted position and an extended position to expand the interior of the volume of the vehicle, the second room section having a floor with a top surface. A pair of substantially parallel outer rails is provided for supporting the first room section, and a pair of substantially parallel inner rails is provided for supporting the second room section, each of the inner rails being slidably mounted for longitudinal movement within one of the outer rails. A floor moving arrangement is secured to each of the inner and outer rails for selectively moving the inner rails into and out of the outer rails to extend and retract the second room section relative to the first room section. The floor moving arrangement is constructed and arranged to translate inward and outward movement between the inner rails and the outer rails to substantially vertical displacement of the floor of the second room section relative to the stationary floor so as to align the top surfaces of the floor sections as the second room section is moved to its extended position, and to vertically offset the top surface of the second room section floor relative to the upper surface of the stationary floor as the second room section is moved to its retracted position. The floor moving arrangement substantially maintains parallelism between a longitudinal axis of the inner rail and the floor of the movable room section, and between a longitudinal axis of the outer rail and the stationary floor over the entire range of movement of the second room section relative to the first room section.

Various other objects, features and advantages of the invention will be made apparent from the following description taken together with the drawings.

BRIEF DESCRIPTION OF THE SEVERAL VIEWS OF THE DRAWING

The drawings illustrate the best mode presently contemplated of carrying out the invention. In the drawings:

FIG. 3 is a perspective view of a vehicle slide-out operating mechanism used in conjunction with the present invention;

FIGS. 4 and 5 are partial side sectional views of the trailer or recreational vehicle of FIG. 1 showing the flat floor arrangement of the present invention in fully retracted and fully extended positions, respectively;

FIG. 6 is an enlarged, partial sectional view taken on line 6—6 of FIG. 4;

FIG. 7 is an enlarged, partial sectional view taken on line 7—7 of FIG. 4;

DETAILED DESCRIPTION OF THE PREFERRED EMBODIMENT

The present invention provides an expandable room section attached to a known trailer or recreational vehicle which provides distinct advantages over the prior art as will be described and appreciated hereafter. In the preferred embodiment, the trailer or recreational vehicle (generally referred to as the vehicle) is equipped with a laterally adjustable wing or slide-out section used to provide additional interior room. However, it should be understood that the invention can also apply to expandable sections or compartments provided on other vehicles for use in construction, military, medical, education, mobile broadcast and other applications to expand the inside volume of the vehicle.

Figure 1:
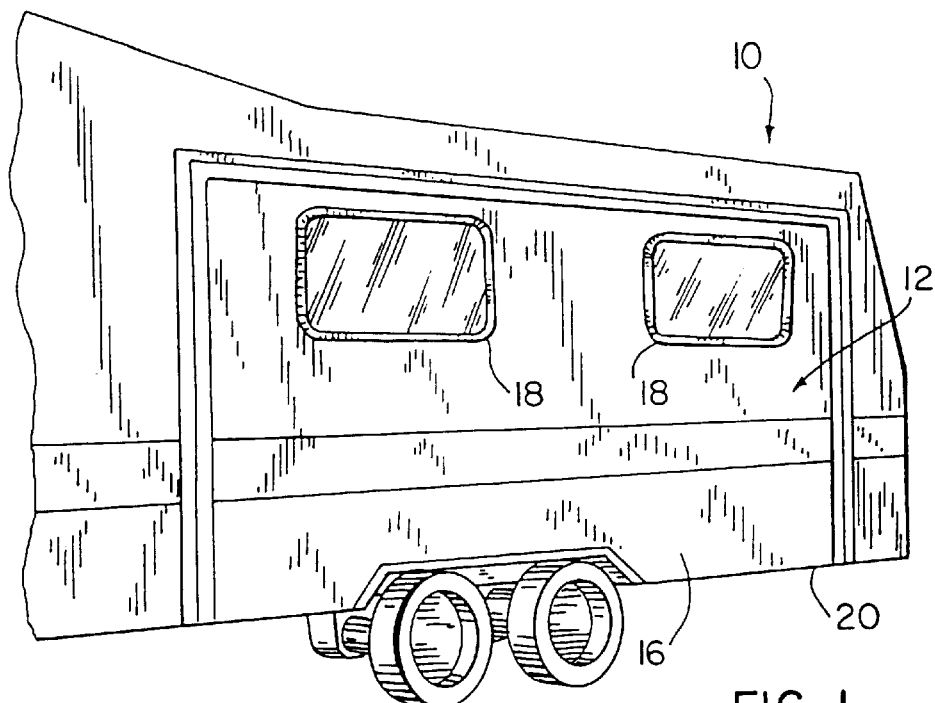
FIG. 1 is a partial, perspective view of a retracted slide-out section of a trailer or recreational vehicle utilizing the flat floor arrangement of the present invention.
Figure 2:
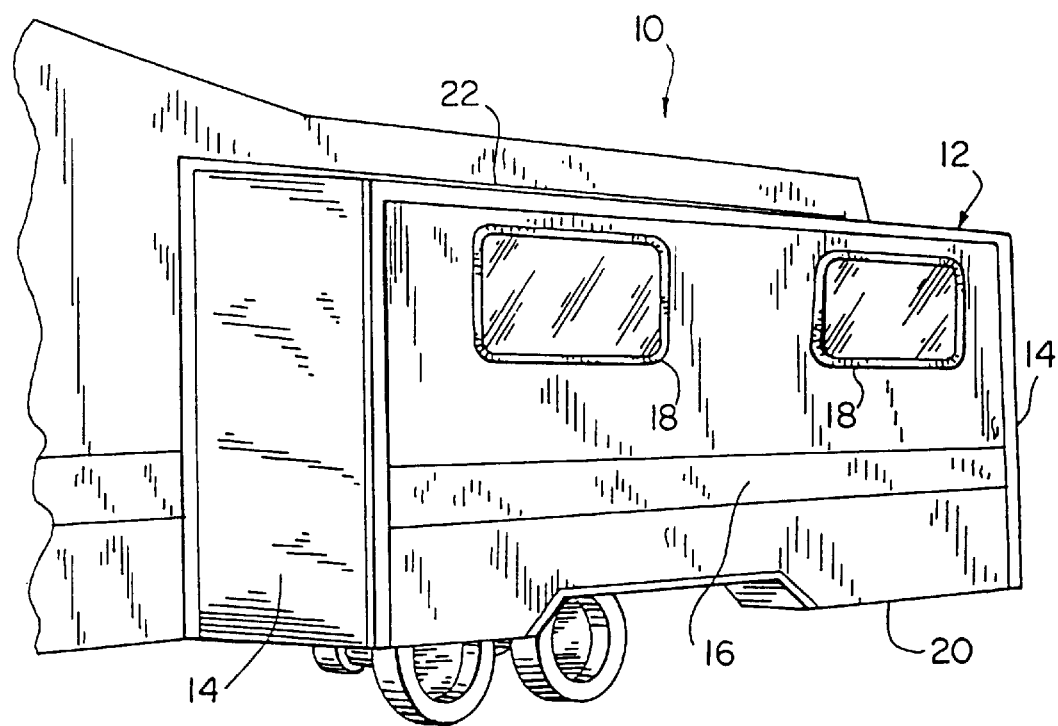
FIG. 2 is a partial, perspective view of the extended slide-out section of the trailer or recreational vehicle of FIG. 1.

Referring now to the drawings, FIG. 1 illustrates a side perspective view of a vehicle body 10 having mounted thereon an expandable telescopic slide-out section 12 of the present invention in its fully retracted position. FIG. 2 is a similar view with slide-out section 12 fully extended or expanded. Slide-out section 12 is rectangularly configured and includes a pair of parallel end walls 14, a sidewall 16 with two windows 18, a bottom wall or floor 20 and a roof 22.

Referring now to FIG. 3, a floor moving and supporting arrangement for selectively controlling the extension and retraction of slide-out section 12 is adapted to be mounted beneath the vehicle body 10 and includes a pair of substantially parallel, tubular outer rails 24. Each of the outer rails 24 is supported by a pair of structural frame members 26, 28 which form part of the frame of the vehicle and which extend along the sides of the vehicle body 10. That is, each outer rail 24 is secured at its inner end 30 to the structural frame member 28. The structural frame member 26 on the side of the vehicle body 10 having the slide-out section 12 is provided with suitable apertures to allow the outer ends 32 of the outer rails 24 to pass through the structural frame member 26 where they are welded in place. Slidably carried for longitudinal movement in the outer rails 24 is a pair of substantially parallel, tubular inner rails 34 for supporting the slide-out section 12 thereon. Each of the inner rails 34 has an inner end 36 confined within the outer end 32 of one of the outer rails 24, and an outer end 38 adapted for attachment by a bracket and fastener assembly 40 to the slide-out section 12. A central reinforcing beam 42 lies between and in parallel relationship with outer rails 24 and is interconnected between structural frame members 26, 28.

As seen in FIGS. 4 and 5, vehicle 10 includes a stationary room section 44 having a stationary floor 46 and slide-out section 12 is slidably movable relative to stationary section 44 between a fully retracted position shown in FIG. 4 and a fully extended position shown in FIG. 5. Stationary room section 44 is supported on the outer rails 24 and/or vehicle frame members 26, 28 and 42, and slide-out section 12 is supported on the inner rails 34 via bracket and fastener assembly 40. Only one of rails 24 and 34 is seen in FIGS. 4 and 5. Slide-out section 12 is movable relative to stationary room section 44 between a first raised position in which slide-out section floor 20 is located above stationary floor 46 when slide-out section 12 is in its retracted position (FIG. 4), and a second lowered position in which slide-out section floor 20 is flush or horizontally coplanar with stationary floor 46 when slide-out section 12 is in its extended position (FIG. 5). The inner end of slide-out section floor 20 and the outer end of stationary floor 46 of stationary room section 44 have respective symmetrical, complementary inclined bearing surfaces 48, 50 engageable with each other when the slide-out section 12 is moved to the extended position of FIG. 5. Bearing surfaces 48, 50 are mirror images of each other with each having the same angle and the same length.

In accordance with the invention, the raising and lowering of the slide-out section 12 to attain a flat floor condition when the slide-out section 12 is extended is accomplished while maintaining parallelism between the inner rails 34 and the movable floor 20, and between the outer rails 24 and the stationary floor 46 over the entire range of extension and retraction of the slide-out section 12. The invention aims to prevent problems in the prior art associated with sagging or tipping of the inner rails relative to the outer rails as the slide-out section moves to its extended position in order to prevent the relatively great local stresses on the components associated with the sagging or tipping rails, and to ensure that binding or skewing will not occur when slide-out section 12 is moved to its lowered position. Such objectives are attained by improvements in the support structure and the drive arrangement beneath the stationary floor 46 and the floor 20 of the slide-out section 12.

With reference to FIGS. 6–11, each outer rail 24 has a generally rectangular cross-section comprised of a top wall 52, a bottom wall 54, and a pair of connecting sidewalls 56, 58. A rectangular mounting plate 60 is connected at the outer end 32 of each outer rail 24 to the outside surface of each sidewall 56, 58 by an upper and lower set of bolts 62 and nuts 64. Each mounting plate 60 has a length which extends downwardly beneath a foreshortened end 53 (FIG. 8) of each bottom wall 54 of each outer rail 24 so as to accommodate a portion of a driving arrangement for the inner rails 34, to be described more fully hereafter. The outer end 32 of each outer rail 24 includes an interior portion or block 66 which extends between sidewalls 56, 58 and is fixed adjacent the top wall 52 of outer rail 24 by the upper set of bolts 62 and nuts 64. A rearward end of the interior portion 66 is formed with an inclined ramp 68 and a flat, horizontal bottom surface 70 which is offset and parallel to the top wall 52 of the outer rail 24 extends forwardly from ramp 68.

Each inner rail 34 is comprised of a top wall 72, a bottom wall 74, and a pair of connecting sidewalls 76, 78 forming a generally square cross-section along substantially the entire length of the inner rail 34 except for the inner end 36. Here, the bottom wall 74 has a sloping surface 80 (FIGS. 8–10) which extends upwardly and rearwardly therefrom parallel to ramp 68, and which merges into a flat, horizontal raised bottom wall 82 offset with and parallel to bottom wall 74 to define a notched or fluted portion 84 having a generally rectangular cross-section. A flexible rack in the form of a roller chain 82 is anchored along the bottom wall 74, the sloped surface 80 and the raised bottom wall 86 of inner rail 34, such as by welding. The flexible nature of the roller chain 86 is such that its attachment in the region of the sloped surface 80 will define a sloped path of travel 88 for an engageable drive gear or toothed sprocket 90 of a drive arrangement which serves to move the inner rails 34 inwardly and outwardly relative to the outer rails 24. Together roller chain 86 and drive gear 90 form a flexible rack and pinion drive arrangement particularly advantageous in bi-directionally moving slide-out section 12 to its extended position as will be better understood hereafter. The welding of roller chain 86 to inner rail 34 provides a low cost means for providing inner rail 34 with a gear-type structure for use in extending inner rail 34.

Drive gear 90 which engages roller chain 86 includes a pair of bosses 91 which are keyed or otherwise attached for rotation on a round segment 92 of a drive shaft assembly 94. The drive shaft segment 92 passes through apertures formed in the mounting plates 60 and is supported by bearing sleeves 96, 98 retained within the apertures by clips 100, 102 which are insertable in suitable openings in the drive shaft segment 92. With reference to FIG. 3, drive shaft assembly 94 interconnects each of the drive gears 90 and includes at least one motive device 104 for providing-rotation force thereto. Preferably, motive device 104 is in the form of an integral electric gear-motor brake such as disclosed in copending U.S. patent application Ser. No. 08/563,043 filed Nov. 27, 1995, the disclosure of which is hereby incorporated by reference. Motive device 104 is engaged with one end of the drive shaft assembly 94 for driving-drive shaft assembly 94, and the opposite end of the drive shaft assembly 94 is provided with an override attachment 106 also disclosed in the aforementioned application to permit the application of rotational force to the drive shaft assembly 94 manually as in the case of a malfunction or failure of motive device 104.

Figure 10:
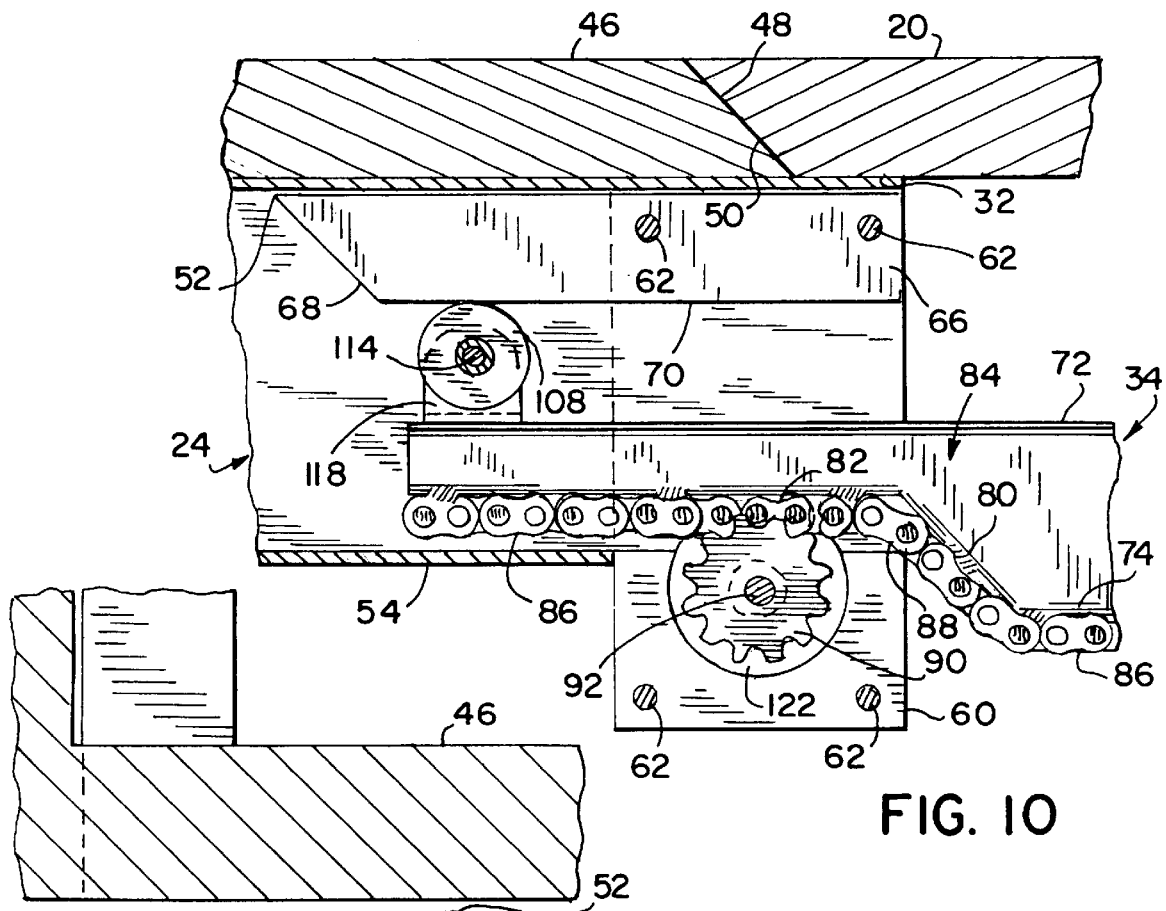
FIG. 10 is an enlarged, partial side sectional view of the drop floor arrangement in its fully extended position of FIG. 5.
Figure 11:
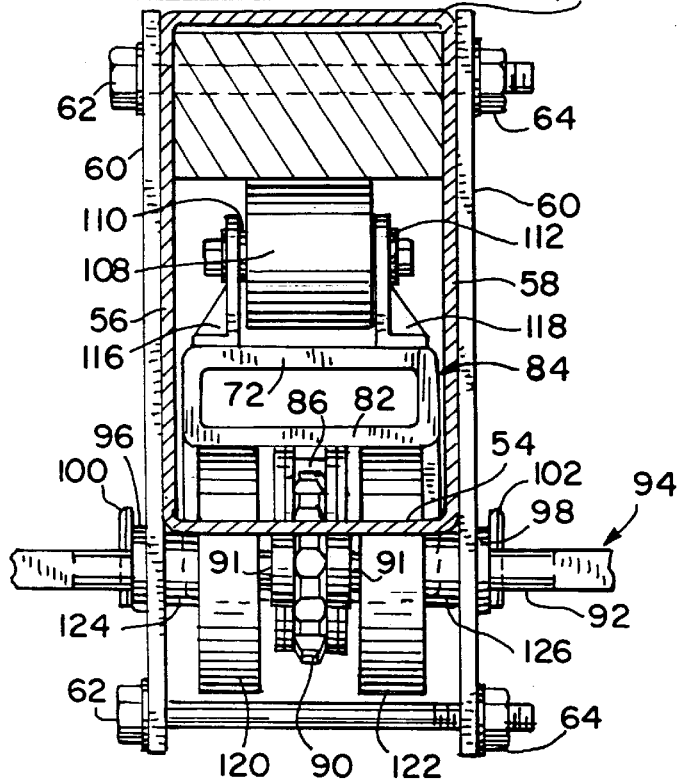
FIG. 11 is an enlarged, partial sectional view taken on line 11—11 of FIG. 5.

The inner rails 34 are carried in the outer rails 24 by means of an upper roller arrangement rotatably mounted at the inner end 36 of each inner rail 34, and a lower roller arrangement rotatably mounted on the drive shaft segment 92. Referring to FIGS. 10 and 11, the upper roller arrangement is comprised of an upper support roller 108 centrally disposed between a pair of bushings 110, 112 for free rotation on a shaft 114. The ends of the shaft 114 are supported in a pair of L-shaped mounting brackets 116, 118 projecting upwardly from the innermost end of the notched portion 84 on inner rail 34. The support roller 108 is disposed for continuous rolling engagement with the underside of outer rail top wall 52 as well as the inclined ramp 68 and flat bottom surface 70 of interior portion 66. The lower roller arrangement is comprised of a pair of lower support rollers 120, 122 positioned on either side of the drive gear 90 for free rotation on the drive shaft segment 92. Each of a pair of bushings 124, 126 is mounted on the drive segment 92 between one of the lower support rollers 120, 122 and a respective mounting plate 60 to prevent axial movement of its associated lower support roller. Inward axial movement of the lower support rollers 120, 122 is limited by the bosses 91 of the drive gear 90. Each set of lower support rollers 120, 122 is suitably sized for continuous rolling engagement along the entire bottom wall 74, sloped surface 80 and raised bottom wall 82 of inner rail 34.

In operation, slide-out section 12 and the drive arrangement of the invention function as follows. With reference to FIGS. 4 and 5, slide-out section 12 is normally nested inside stationary room section 44 when the vehicle 10 is in transit. In this retracted position, floor 20 of slide-out section 12 is disposed above stationary floor 46 with each upper support roller 108 engaged against the underside of top wall 52 of one outer rail 24, and each pair of lower support rollers 120, 122 in contact with the bottom wall 74 of an inner rail 34. With the vehicle 10 parked and levelled, inner rails 34 are telescoped out of outer rails 24 by operation of the motive device 104, which rotates drive shaft assembly 94 and its associated segment 92 to thereby rotate drive gears 90. The teeth of drive gears 90 are engaged with roller chains 86, such that rotation of drive gears 90 commences outward movement of slide-out section 12 relative to the stationary room 44, and thereby sliding movement of floor 20 directly upon stationary floor 46. As slide-out section 12 is moved past the first partially extended position shown in FIG. 8, outward lateral movement of inner rails 34 and floor 20 causes inclined bearing surface 48 of movable floor 20 to begin to slide downwardly along the cooperative inclined bearing surface 50 of stationary floor 46 as shown in FIG. 9. At the same time, each upper support roller 108 begins to roll downwardly along the inclined ramp 68 and each drive gear 90 begins to engage the roller chain 86 along the sloped path 88 in the region of the sloped surface 80 so as to progressively lower or drop inner rail 34 and slide-out section 12 attached thereto. The effect of the drive motion along the sloped path 88 is to effectively create a drop room arrangement which moves slide-out section 12 in combined lateral and vertical directions as inner rails 34 are telescoped outwardly relative to outer rails 24. Inclined bearing surface 48 slides downwardly on inclined bearing surface 50 as slide-out section 12 is moved to its extended position, as shown in FIG. 9. In this manner, the outer end of slide-out section 12 is moved laterally and lowered by the notched inner end configuration of inner rail 34 and engagement of support rollers 108 with ramps 68 and lower surfaces 70 of interior blocks 66, while the inner end of slide-out section 12 is simultaneously moved laterally and lowered by engagement of inclined bearing surfaces 48 and 50, until floor 20 of slide-out section 12 is in its fully lowered position shown in FIG. 10 wherein its upper surface and the upper surface of stationary floor 46 are flush or horizontally coplanar with each other.

With this construction, it can be appreciated that the undesirable floor height differential present in the prior art expanded slide-out assemblies is eliminated. It should also be appreciated that the inclined ramp 68 on the outer rail 24 and the sloped surface 80 on the inner rail 24 cooperate with their respective support rollers 108 and 120, 122 to help maintain parallelism between a longitudinal axis of the outer rail 24 and stationary floor 46, and a longitudinal axis of inner rail 34 and slide-out section 12 at all times throughout the extension and retraction of slide-out section 12. By maintaining parallelism, the support rollers 108, 120 and 122 also function to prevent binding and skewing of the slide-out section 12. Besides being supported by the support rollers 108, 120, 122, each of the inner rails 34 is further supported by the drive gear 90 in a cantilevered relationship such that there is no sagging or tipping of the inner rails 34 relative to the outer rails 24 or the drive gear 90.

The lengths and the angles of the bearing surface 48, the inclined ramp 68 and the sloped surface 80 are suitably chosen so as to smoothly and positively direct floor 20 of slide-out section 12 and stationary floor 46 into flush relationship with one another. The particular combination of results is achieved especially by forming the bearing surface 48, the inclined ramp 68 and the sloped surface 80 at substantially the same angle. In the preferred embodiment, movable floor 20 is raised and lowered approximately 1.75 inches but it can be appreciated that this dimension can be altered by modifying the various dimensions and shapes of the aforementioned components 48, 68 and 80 accordingly.

Figure 8:
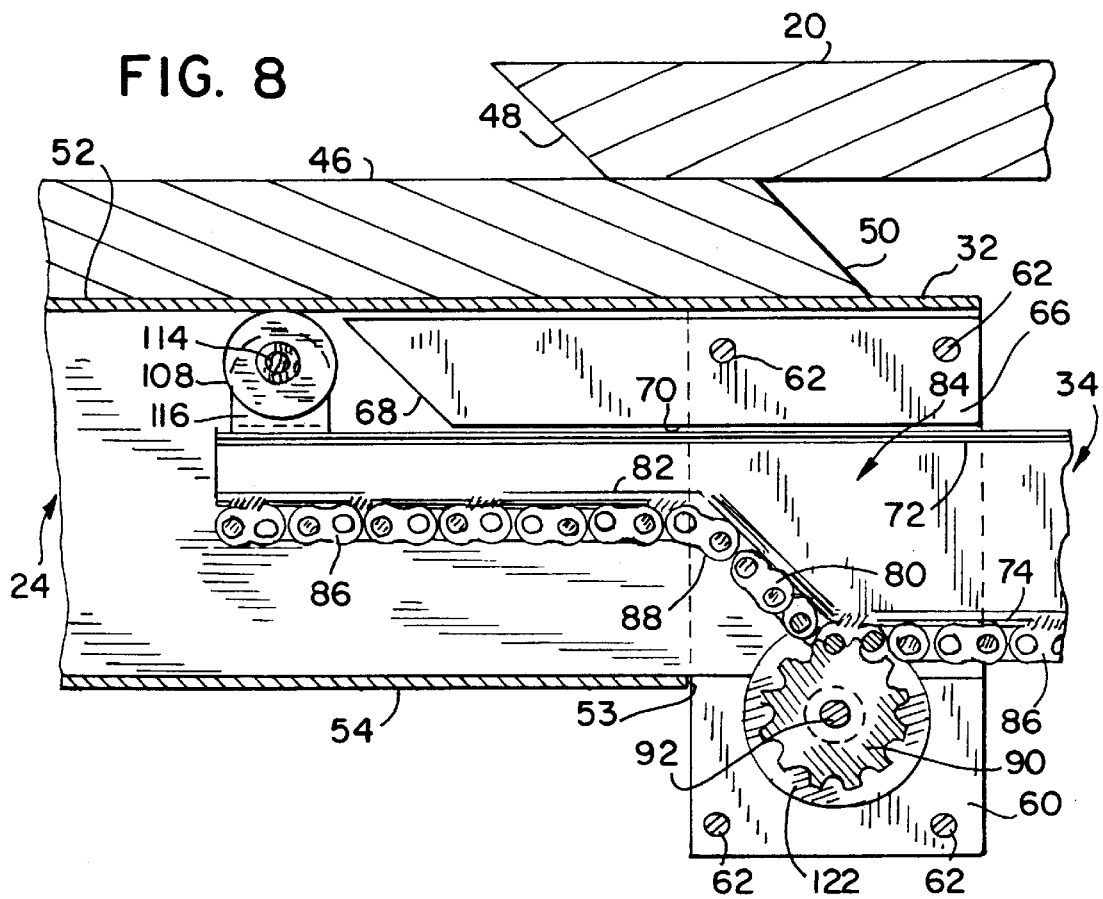
FIGS. 8 and 9 are enlarged, partial side sectional views of the drop floor arrangement of the present invention in first and second partially extended positions respectively.
Figure 9:
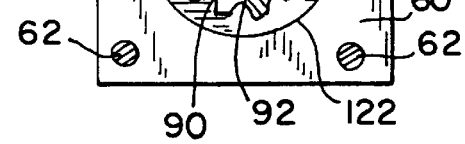

When slide-out section 12 is moved from its extended position towards its retracted position, angled bearing surface 48 of floor 20 rides upwardly along angled bearing surface 50 of stationary floor 46 to elevate slide-out section 12 above stationary floor 46 as shown in FIG. 8. Simultaneously, retraction of the inner rails 34 by the drive arrangement will cause the support rollers 108, 120, 122 to ride along ramp 68 and sloped surface 80, respectively, to assume their starting positions as the underside of floor 20 moves upon the upper surface of stationary floor 46 so as to be positioned parallel to and vertically offset over stationary floor 46 in the fully retracted position of FIG. 4.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth in the following claims.

I claim:

1. In a slide-out arrangement for a vehicle having an interior with a stationary floor and including a movable room section movable between a retracted position and an extended position to expand the volume of the vehicle interior, the movable room section having a floor, wherein the top surface of the movable room section floor is substantially coplanar with an upper surface of the stationary floor when the movable room section is in its extended position and is vertically offset relative to the stationary floor when the movable room section is in its retracted position, the slide-out arrangement including an operating system for moving the movable room section between its extended and retracted positions, the improvement comprising the operating system being constructed and arranged so as to provide simultaneous lateral and vertical movement of the movable room section relative to the vehicle interior as the movable room section is moved between its extended and retracted positions while maintaining the floor of the movable room section substantially parallel to the stationary floor during movement of the movable room section to and between its extended and retracted positions, wherein a pair of substantially parallel outer rails are disposed below the stationary floor and the movable floor is interconnected with a pair of substantially parallel inner rails, each of the inner rails being slidably mounted for longitudinal movement within one of the outer rails, and including a drive arrangement provided on each pair of inner rails and outer rails having a drive gear, a drive shaft joining each of the drive gears to provide rotational force thereto and means connected to the drive shaft assembly for rotating the drive gears to move the inner rails relative to the outer rails.

2. The improvement of claim 1, wherein the drive arrangement includes drive gear engagement structure disposed along a sloped path on each inner rail and engageable with the drive gear to enable movement of the movable room section between an operative position in which a top surface of the movable room section floor is substantially coplanar with an upper surface of the stationary floor when the movable room section is in its extended position, and an inoperative position in which the movable room section is vertically offset relative to the stationary floor so as to permit the movable room section to move to the retracted position.

3. The improvement of claim 2 wherein the drive gear engagement structure disposed along a sloped path on each inner rail comprises a roller chain secured to each inner rail along a ramped surface defined by each inner rail.

4. The improvement of claim 3, wherein each inner rail defines an inner end which includes a notched portion defining the ramped surface along which the roller chain is secured.

5. The improvement of claim 2, including an inclined ramp located toward an outer end defined by each outer rail, and a support roller arrangement located toward an inner end of each inner rail for engagement with the inclined ramp as the inner rails are moved relative to the outer rails.

6. The improvement of claim 5, including a second roller arrangement mounted for rotation on the drive axis of the drive gear for engagement with each inner rail as the inner rails are moved relative to the outer rails.

7. The improvement of claim 6, wherein the inner rails and the outer rails are suitably dimensioned such that, at a predetermined point in movement of the movable section between the retracted position and the extended position, the first support roller arrangement will move along the inclined ramp and the drive gear will simultaneously engage the sloped path of the drive gear engagement structure thereby moving the inner rails laterally as well as vertically so as to move the movable room section between the operative and inoperative positions.

8. In a vehicle having an interior with a stationary floor and including a movable section movable between a retracted position and an extended position to expand the volume of the vehicle interior, and a pair of substantially parallel outer rails secured to the vehicle, each of the outer rails having an inner end and an outer end, the vehicle further including a movable section supported on a pair of substantially parallel inner rails and having a floor, each of the inner rails being mounted for longitudinal movement relative to one of the outer rails, each of the inner rails having an inner end and an outer end, the improvement comprising:

a cooperating ramp arrangement located toward the outer end of each outer rail and the inner end of each inner rail for permitting the movement of the movable room section floor between an operative position in which a top surface of the movable room section floor is substantially coplanar with an upper surface of the stationary floor when the movable room section is in the extended position, and an inoperative position in which the movable room floor is vertically offset above the stationary floor so as to enable the movable room section to be moved to the retracted position.

9. The improvement of claim 8, wherein the movable room section floor defines an inner end and wherein the stationary floor defines an outer end, and wherein the inner end of the movable room section floor is supported on the outer end of the stationary floor when the movable room section is moved to its extended position.

10. The improvement of claim 9, wherein the inner end of the movable room section floor and the outer end of the stationary floor have complementary inclined surfaces engageable with each other when the movable room section is in its extended position.

11. The improvement of claim 10, wherein the movable room section floor defines a bottom surface engageable with a top surface defined by the stationary floor during movement of the movable room section to its retracted position, wherein the lower surface of the movable room section floor remains in engagement with the stationary floor upper surface when the movable room section is in its retracted position.

12. The improvement of claim 8, wherein a longitudinal axis of each outer rail remains parallel to the upper surface of the stationary floor, and a longitudinal axis of each inner rail remains parallel to the top surface of the movable room section floor, when the movable room section is moved between its extended and retracted positions.

13. The improvement of claim 8, wherein an outer end defined by each outer rail includes an interior portion having an inclined surface and a bottom surface offset with and parallel to a top wall defined by each outer rail.

14. The improvement of claim 13 wherein a first support roller is mounted on an inner end defined by each inner rail for rolling supportive engagement along a top wall of each outer rail, and along the inclined surface and the bottom surface on the interior portion of the outer rail.

15. The improvement of claim 14, wherein an outer end defined by each outer rail includes a drive gear rotatably mounted about a drive axis thereon for engagement with engagement structure provided on each inner rail.

16. The improvement of claim 15, including a pair of second support rollers rotatably mounted on the drive axis, one of the second support rollers being disposed on each side of the drive gear for rolling supportive engagement along a bottom wall of the inner rail.

17. The improvement of claim 8, wherein an inner end defined by each inner rail includes a sloped surface and a raised bottom wall offset with and parallel to a bottom wall defined by the inner rail to define a notched portion of the inner rail.

18. The improvement of claim 17, wherein the bottom wall of each inner rail carries a flexible rack in the form of a roller chain defining a sloped path of travel in the region of the notched portion, and wherein an outer end defined by each outer rail includes a drive gear engageable with the roller chain.

19. In a slide-out arrangement for a vehicle having an interior with a stationary floor and including a movable room section movable between a retracted position and an extended position to expand the volume of the vehicle interior, the movable room section having a floor, and an operating mechanism interconnected with the movable room section for moving the movable room section between its retracted position and its extended position, the operating mechanism including a rail member interconnected with the movable room section and a drive mechanism drivingly engaged with the rail member for moving the rail member relative to the vehicle, the improvement comprising a movable support interconnected with the rail member for supporting the rail member as the rail member moves relative to the vehicle, the movable support being interconnected with the rail member at a location spaced from the interconnection of the rail member with the movable room section, a rotatable drive member associated with the drive mechanism and engageable with engagement structure provided on the rail member for moving the rail member relative to the vehicle, wherein the rail member engagement structure includes a sloped area between the support member and the interconnection of the rail member with the movable room section for simultaneously vertically displacing the rail member relative to the vehicle and laterally moving the rail member relative to the vehicle to thereby cause simultaneous lateral and vertical movement of the movable room section relative to the vehicle.

* * * * *